(12) United States Patent
Shepard

(10) Patent No.: US 10,214,241 B2
(45) Date of Patent: Feb. 26, 2019

(54) TRAILER BACKING UP SYSTEM ACCESSORIES

(71) Applicant: Daniel Robert Shepard, Stratham, NH (US)

(72) Inventor: Daniel Robert Shepard, Stratham, NH (US)

( * ) Notice: Subject to any disclaimer, the term of this patent is extended or adjusted under 35 U.S.C. 154(b) by 25 days.

(21) Appl. No.: 15/788,111

(22) Filed: Oct. 19, 2017

(65) Prior Publication Data

US 2018/0037261 A1 Feb. 8, 2018

Related U.S. Application Data

(63) Continuation-in-part of application No. 15/263,796, filed on Sep. 13, 2016.

(60) Provisional application No. 62/217,921, filed on Sep. 13, 2015.

(51) Int. Cl.
| | | |
|---|---|---|
| B60D 1/62 | (2006.01) |
| B60D 1/36 | (2006.01) |
| B60D 1/58 | (2006.01) |
| B62D 15/02 | (2006.01) |
| B60R 1/00 | (2006.01) |
| B60D 1/06 | (2006.01) |
| B60D 1/24 | (2006.01) |
| B62D 13/06 | (2006.01) |

(52) U.S. Cl.
CPC ............ *B62D 15/029* (2013.01); *B60D 1/06* (2013.01); *B60D 1/245* (2013.01); *B60D 1/62* (2013.01); *B60R 1/003* (2013.01); *B62D 13/06* (2013.01); *B62D 15/02* (2013.01); *B62D 15/028* (2013.01); *B60R 2300/808* (2013.01); *B60R 2300/8086* (2013.01)

(58) Field of Classification Search
CPC .................................................... B62D 15/028
See application file for complete search history.

(56) References Cited

U.S. PATENT DOCUMENTS

| | | | |
|---|---|---|---|
| 2005/0206225 A1* | 9/2005 | Offerle | B60T 8/1706 303/7 |
| 2006/0111836 A1* | 5/2006 | Fast | G01C 21/3626 701/413 |
| 2011/0001614 A1* | 1/2011 | Ghneim | B60K 35/00 340/435 |
| 2014/0229070 A1* | 8/2014 | Witting | B62D 13/06 701/42 |
| 2014/0379219 A1* | 12/2014 | Rhode | B62D 13/06 701/41 |
| 2015/0084755 A1* | 3/2015 | Chen | G08G 1/16 340/435 |
| 2015/0115571 A1* | 4/2015 | Zhang | B60D 1/06 280/477 |
| 2016/0257341 A1* | 9/2016 | Lavoie | B62D 13/06 |
| 2017/0008559 A1* | 1/2017 | Shepard | B62D 13/06 |

* cited by examiner

*Primary Examiner* — Joseph H Feild
*Assistant Examiner* — Pameshanand Mahase

(57) ABSTRACT

The present invention relates to display means for systems for guiding a trailer while backing, and in particular to graphical display means to provide information to an operator who is steering, and controlling the accelerator and breaks by suggesting the amount of steering to apply to the towing vehicle to cause the trailer to be directed to where the operator wants the trailer to go.

20 Claims, 13 Drawing Sheets

TRAILER BACKING UP SYSTEM ACCESSORIES

CROSS-REFERENCE TO RELATED APPLICATION

This application is a Continuation-in-Part of application Ser. No. 15/263,796 entitled "TRAILER BACKING UP SYSTEM ACCESSORIES" filed Sep. 13, 2016 and that Patent Application makes reference to, and both applications claim the benefit of, U.S. Provisional Patent Application 62/217,921 by Shepard titled "TRAILER BACKING UP SYSTEM ACCESSORIES" that was filed on Sep. 13, 2015 and those applications are incorporated herein in their entirety by reference; this Patent Application also makes reference to U.S. patent application Ser. No. 15/234,429 by Shepard titled "TRAILER BACKING UP SYSTEM DISPLAY" that was filed on Aug. 11, 2016 and that application claims the benefit of U.S. Provisional Patent Application 62/203,463 by Shepard titled "TRAILER BACKING UP SYSTEM DISPLAY" that was filed on Aug. 11, 2015 (both of which were filed by and at all times after filing were continuously owned by the same sole inventor applicant as the present application), and in addition, this Patent Application makes reference to U.S. Pat. No. 7,715,953 (the '953 patent) by Shepard titled "TRAILER BACKING UP DEVICE AND METHOD" which issued on May 11, 2010 and U.S. Pat. No. 9,132,856, by Shepard titled "TRAILER BACKING UP DEVICE AND TABLE BASED METHOD" that issued on Sep. 15, 2015 (the '856 patent) and U.S. patent application Ser. No. 14/791,283, by Shepard titled "PORTABLE TRAILER GUIDANCE SYSTEM" that was filed on Jul. 3, 2015 and U.S. Provisional Patent Application 62/222,777, by Shepard titled "IMU BASED HITCH ANGLE SENSING DEVICE" that was filed on Jul. 3, 2015 and all those applications are incorporated herein in their entirety by reference.

TECHNICAL FIELD

In various embodiments, the present invention relates to systems for guiding a trailer while backing and, in particular, the present invention relates to the displays used with systems for guiding a trailer while backing.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. Various innovations have been introduced to address this problem in whole or in part. Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem. Shepard in his U.S. Pat. No. 7,715,953 teaches a complete working system. However, in that teaching, some new needs arise that are addressed by the teaching of the present invention, such as how to install a complete working system as an after market product that can easily be installed or removed and how to install a sensor for measuring the angle formed between the centerline of the vehicle and the centerline of the trailer (i.e., the hitch angle sensor or, as it is sometimes also known, the articulation angle sensor) such that it does not interfere or collide with the trailer tongue or any other parts of the hitching system. In particular, an angle sensor is needed that can get its measurement in-line with the axis of rotation of the trailer tongue upon the hitch ball (i.e., to measure the articulation angle of this hitch joint) without actually being located at that axis of rotation. This hitch angle sensor, in particular, must be designed not to be damaged either during hitching up a trailer (due to a collision between the hitch and sensor with a part of the trailer) nor while towing on the highway (due to kicked up debris).

Trailer guidance systems such as the portable system disclosed in U.S. Patent Application 62/020,526, by Shepard titled "PORTABLE TRAILER GUIDANCE SYSTEM" that was filed on Jul. 9, 2014 require sensors for detecting the hitch angle and the turning radius and output means for displaying the intended trailer destination. Most vehicles do not have integral turning sensors and most trailers and/or hitches do not have integral hitch angle sensors. A solution is to make a hitch angle sensor that can be added to an existing vehicle that did not have such capability leaving the automotive assembly line. Once such an investment in a hitch angle measurement sensor is made, it is possible to leverage this sensor for not only measuring the angle of the hitch, but to also adapt the angle measuring mechanism of the hitch angle sensor to create a guidance mechanism to assist a driver in backing up the vehicle in order to couple the vehicle to the trailer.

SUMMARY

The present invention relates to display means for systems for guiding a trailer while backing, and in particular to graphical display means to provide information to an operator who is steering, and controlling the accelerator and breaks by suggesting the amount of steering to apply to the towing vehicle to cause the trailer to be directed to where the operator wants the trailer to go.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawing, in which.

DETAILED DESCRIPTION

Figure 1:
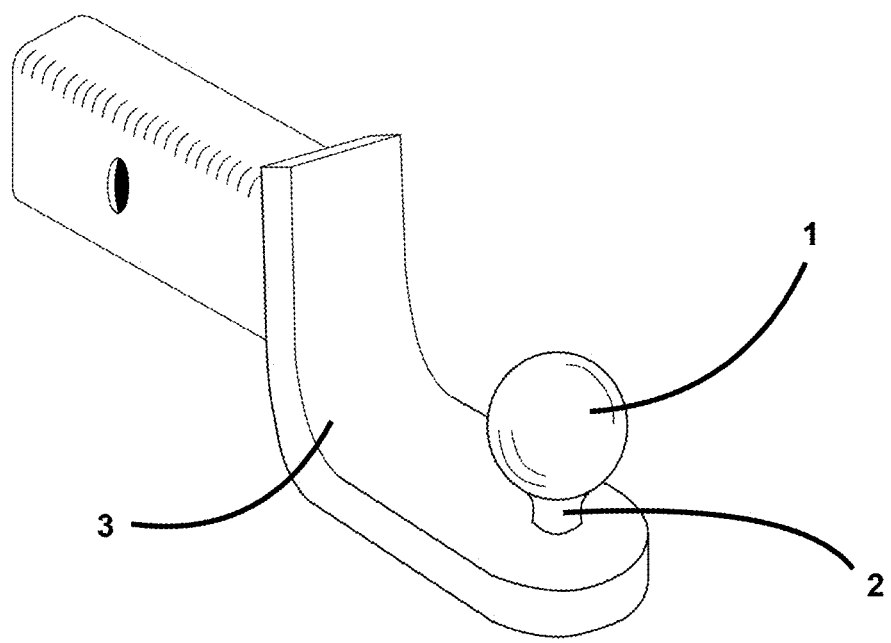
FIG. 1 depicts a hitch ball mounted on a hitch ball mount.

The present invention relates to systems for guiding a trailer while backing and in particular to display means for systems for guiding a trailer while backing that provide guidance on steering the towing vehicle. FIG. 1, illustrates a typical hitch ball mount with a hitch ball mounted. The hitch ball 1 is typically a solid metal sphere with a stem 2 extending from the bottom of the ball and whereby the bottom portion of the stem is threaded. The hitch ball mount 3 has a corresponding hole through it to enable inserting the threaded stem to pass through the hitch ball mount and be secured from below with a hitch ball nut.

Figure 2:
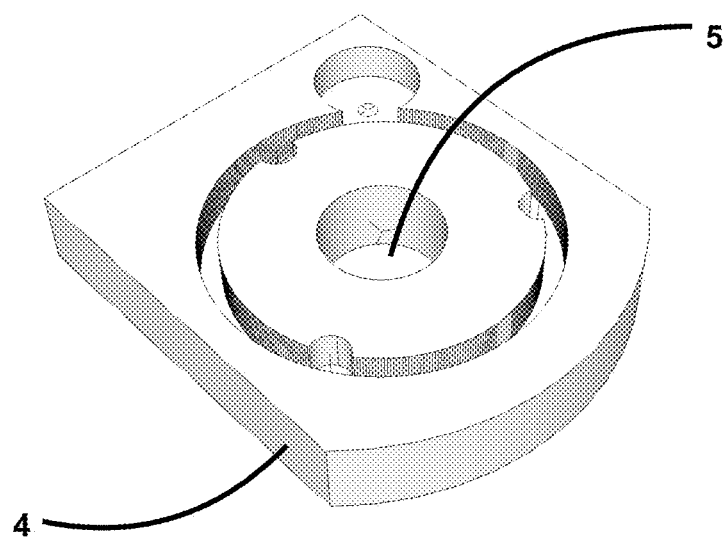
FIG. 2 depicts a hitch angle sensor adaptor plate in accordance with various embodiments of the invention.

FIG. 2 shows a possible configuration of an adaptor plate 4 according to the present invention. This plate has a hole 5 that matches the hole in the hitch ball mount such that the adaptor plate can be inserted between the hitch ball and hitch ball mount when the hitch ball is secured to the mount. This will secure the adaptor plate between the ball and the mount. The plate must not be significantly thicker than the amount of threaded stem that is exposed below the hitch ball nut when the hitch ball in mounted without the adaptor plate. This will enable an existing hitch ball and hitch ball mount to be separated and then reattached with the adaptor plate in between. This approach will serve to keep costs low while keeping shipping costs low. By selling only the adaptor plate to be added to an existing hitch ball and hitch ball mount, the weight of the product being shipped is greatly reduced (the hitch ball and the hitch ball mount are both made from heavy steel or other metal and would be costly to ship).

Figure 3:
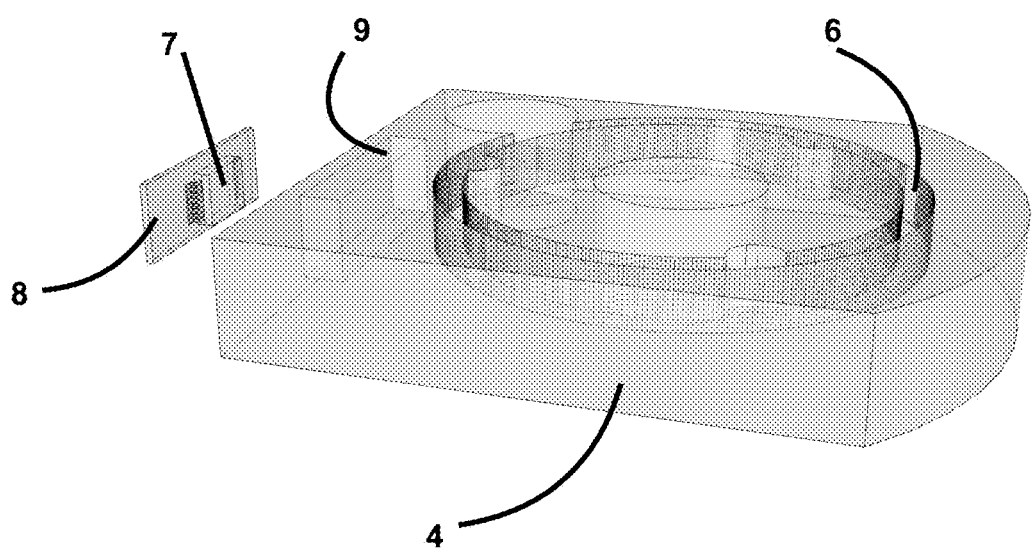
FIG. 3 depicts an x-ray view of the hitch angle sensor adaptor plate in accordance with various embodiments of the invention.

As shown in FIG. 3, the adaptor plate 4 has a circular groove 6 in which a toothed ring is mounted on supporting spacers. This toothed ring will match the teeth of a gear mounted on a shaft in a circular recess in the top corner. This shaft goes through a hole to another gear which turns a final gear assembly that supports a diametrically magnetized permanent magnet that is sensed by a rotation sensor integrated circuit such as the Austrian Microsystems AS5040. Electronic circuitry 7 can be mounted on a board 8 that is mounted in a recess 9 at the back of the adaptor plate 4. This circuitry may also include wired or wireless connection to the backup guidance system (a wired connection could be made through the trailer wiring harness and a wireless connection could be implemented using a Bluetooth communications link, a WiFi communications link, a radio link, a ZigBee communications link or any other wireless connection using any wireless communications standard); power could be provided through the wiring harness or through the use of a battery.

Figure 4:
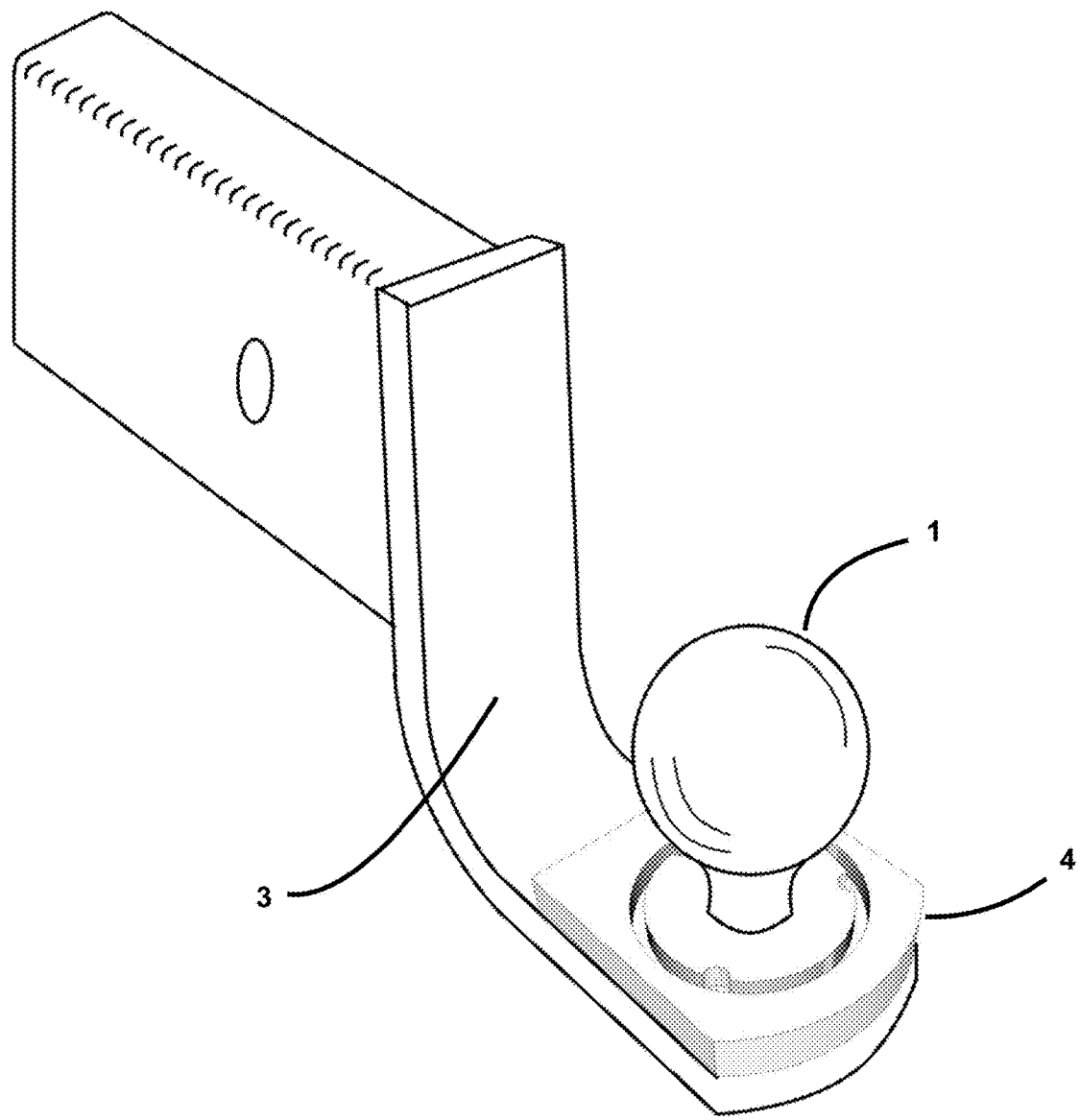
FIG. 4 depicts a hitch angle sensor adaptor plate mounted between a hitch ball and a hitch ball mount in accordance with various embodiments of the invention.

FIG. 4 depicts the adaptor plate 4 after it is fastened between the hitch ball 1 and the hitch ball mount 3. Optionally to prevent the adaptor plate from twisting and becoming misaligned while tightening the hitch ball nut, a textured surface can be incorporated into the bottom surface of the adaptor plate. The adaptor plate is made of a hard material such as steel so that it can withstand the compression from the hitch ball after tightening the hitch ball nut and also so that it can survive any accidental collision with a trailer tongue during vehicle to trailer coupling. Likewise, the recess for the toothed ring is to protect the toothed ring from corresponding damage. To prevent corrosion from forming over time and interfering with the smooth rotation of the toothed ring and its matching gear and supporting spacers, stainless steel is recommended. Many sensing circuits and mechanical configurations will be apparent to those skilled in the art in light of the present teaching.

Figure 5:
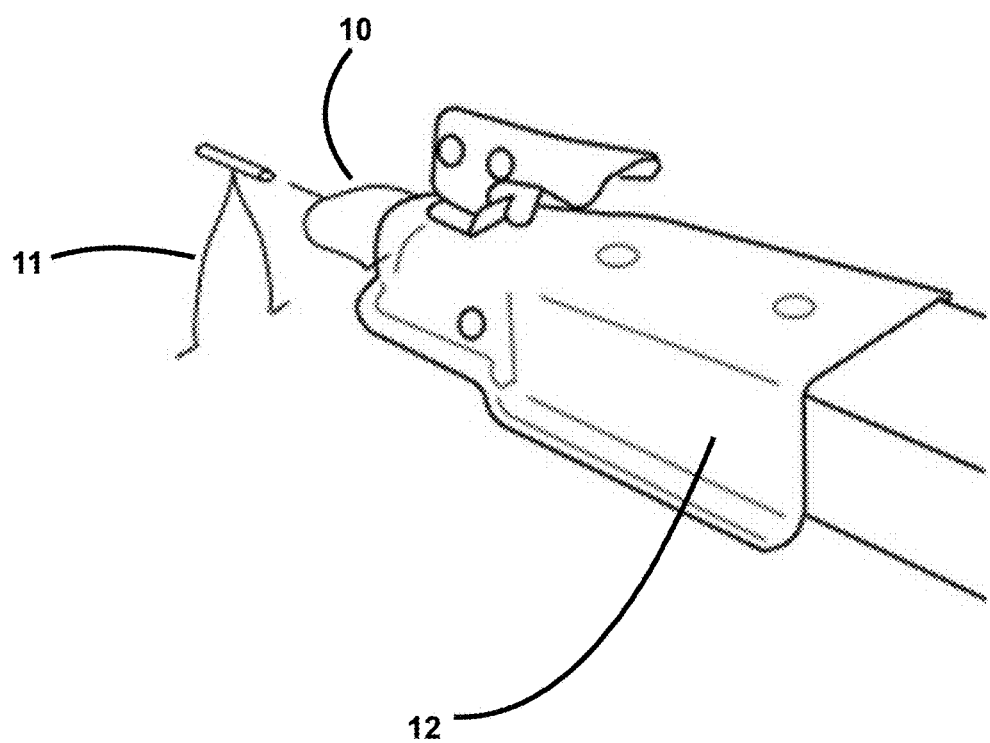
FIG. 5 depicts a stethoscope and wishbone interconnect in accordance with various embodiments of the invention.
Figure 6:
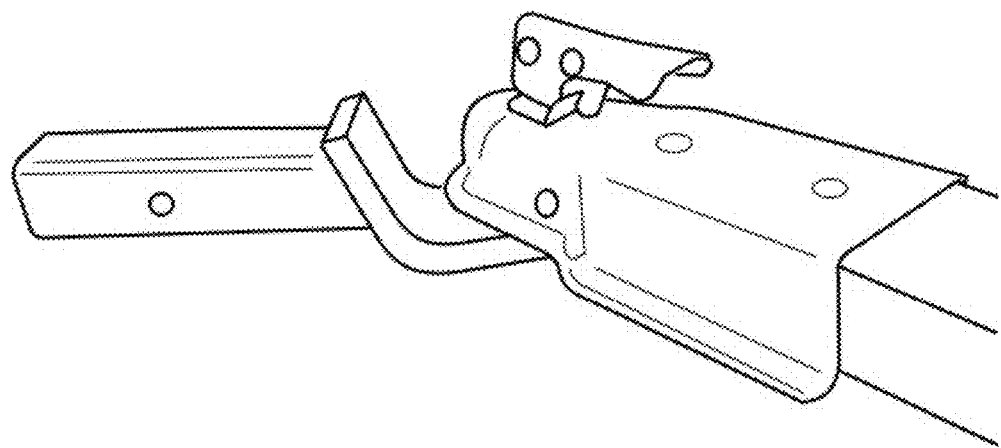
FIG. 6 depicts a coupled hitch ball and trailer tongue.

FIG. 5 depicts a stethoscope 10 and wishbone 11 pin to connect the trailer tongue 12 to the toothed ring. In this way, as the hitch angle changes, the stethoscope and wishbone pin will cause the toothed ring to rotate in the circular groove thereby causing the mechanical coupling to turn the magnet which is sensed by the electronics. The stethoscope and wishbone pin are designed to be very inexpensive to make its replacement if lost non-costly. The stethoscope portion connects to the tongue on opposite sides of the hitch ball equator either by drilling a small matching mating hole on each side of the tongue's coupler or by attaching a supporting plate to either side of the tongue's coupler with each plate having a similarly located matching mating hole (these supporting plates can be mounted by removing the bolts that fasten the coupler to the tongue and reinserting those bolts with the supporting plates inline as will be understood by those skilled in the arts). The stethoscope is made from a springy wire and will snap into place in the matching mating holes with the spring pressure from opposite sides of the coupler providing enough pressure to hold it in place while still enabling the stethoscope to rotate in place in the matching mating holes. This ability to rotate in place will allow the trailer to pitch up and down (where yaw is the hitch angle being measured) without affecting the hitch angle measurement and without causing the stethoscope and wishbone pin to be dislodged. The neck of the stethoscope inserts into a tube whereby the neck can rotate freely within the tube without excessive looseness or lash. This ability to rotate in place will allow the trailer to roll without affecting the hitch angle measurement and without causing the stethoscope and wishbone pin to be dislodged. The wishbone piece comprises the tube and two legs. These two legs hold their opened position due to the springiness of the wire, but enable a user to pinch the two legs together such that the two feet can be inserted into a slot in the toothed ring and when the pinch is released, the two feet will engage holes in either ends of that slot in the toothed ring to hold the wishbone in place. The stethoscope can be formed from a single piece of wire where the neck portion is formed first by bending the wire back against itself and then parting the two ends out and around the coupler. The wishbone can also be formed from a single piece of the same or similar type of wire by coiling the wire to form the tube portion and then down and apart to form the two legs. By fabricating the stethoscope and wishbone pin in this way, the cost of this component can be kept very low making replacement if lost very affordable. FIG. 6 shows the coupler coupled to the hitch ball.

Figure 7:
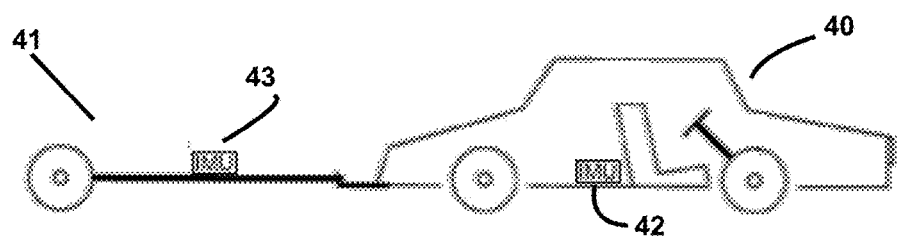
FIG. 7. depicts a vehicle and a trailer where both the vehicle and the trailer have an Inertial Measurement Unit (IMU) device.

FIG. 7 depicts (as is disclosed in U.S. Provisional Patent Application 62/222,777 by Shepard titled "IMU BASED HITCH ANGLE SENSING DEVICE"—the '777 application) an alternative hitch angle sensing device based on an Inertial Measurement Unit (IMU). In so much as IMU's comprising gyroscopes can be utilized to measure rotation about a given orientation (e.g., about the gravity vector), this approach to a hitch angle measurement device is achieved by having an IMU 42 in the vehicle 40 and an IMU 43 on the trailer 41, determining a reference orientation by identifying the direction of gravity when at rest during an initialization routine, and then measuring rotation from the reference position about the gravity vector for both the vehicle and trailer (such IMU calculations are well known and understood to those skilled in the art of IMU mathematics and software). With the rotation for both the vehicle and trailer in hand, the hitch angle can be determined as described in the '777 application.

Figure 8:
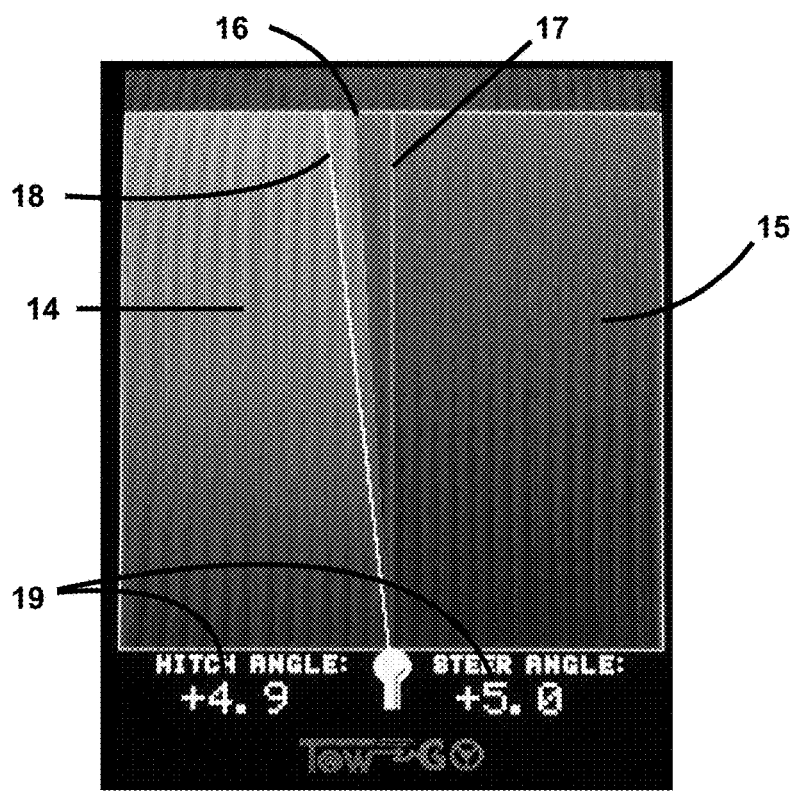
FIG. 8 depicts a display for guiding a user while backing with a trailer.

A means to display the system in action is a necessary part, particularly when operating without servo controlled steering (i.e., when the operator is controlling the steering, throttle and break). FIG. 8 depicts one such display wherein the graphical representation is of the area behind the vehicle and trailer (complete with a representation of the hitch ball location). Typically, this display is a hand-held or a portable device (such as a smart phone like an iPhone or a tablet like an iPad, or some other portable or mobile device such as a laptop computer, or a portable computer) that is wirelessly connected to the trailer backup system (a wired display device could also be used but with less convenience). For a wireless display device, the wireless link could be affected using WiFi, Bluetooth, ZigBee, or any of a number of commercially available wireless protocols or a proprietary protocol using the same or other radio, visible light, invisible light communications. This display component will communicate with other components of the system such as the electronics proximate to the hitch to contribute to the determination of the hitch angle, electronics proximate to the steering to contribute to the determination of the turning radius of the vehicle, or other electronics or computing components for performing calculations or otherwise contributing to the determination of the trailer's predicted direction.

The background color of the display indicates the range 14 that is directly within reach of the guided trailer (green) as well as the range 15 that would require at least one reversing maneuver to reach (red). The boundary 16 between these two areas corresponds to the current trailer direction (a.k.a. the trailer centerline boundary, TCB, or the hitch angle line) and the angle between this boundary and the gray centerline 17 is the current hitch angle. The superimposed white line 18 corresponds to the current predicted direction where the vehicle would become inline with the trailer given the current position of the steering wheel. In operation, the driver would backup the trailer until the while line is showing the direction corresponding to the desired destination for the trailer. As the vehicle and trailer are backed up, the trailer will turn towards the white line and the vehicle will turn (at a faster rate) towards the trailer. Since the vehicle will be converging on the direction of the trailer, the hitch angle will be getting smaller and the display graphic will appear to rotate so as to bring the TCB to the center of the display (i.e., towards the gray centerline, which does not move). As the hitch angle changes, the driver will adjust his or her steering by observing the white line to keep the trailer on course towards the intended direction. Also on this display, the hitch angle as currently measured and/or other system values (such as the steering angle, the prediction angle, the steering wheel angle, the front wheels angle, the trailer length, the wheel base, or the like) can optionally be shown numerically at the bottom of the display 19.

Figure 9:
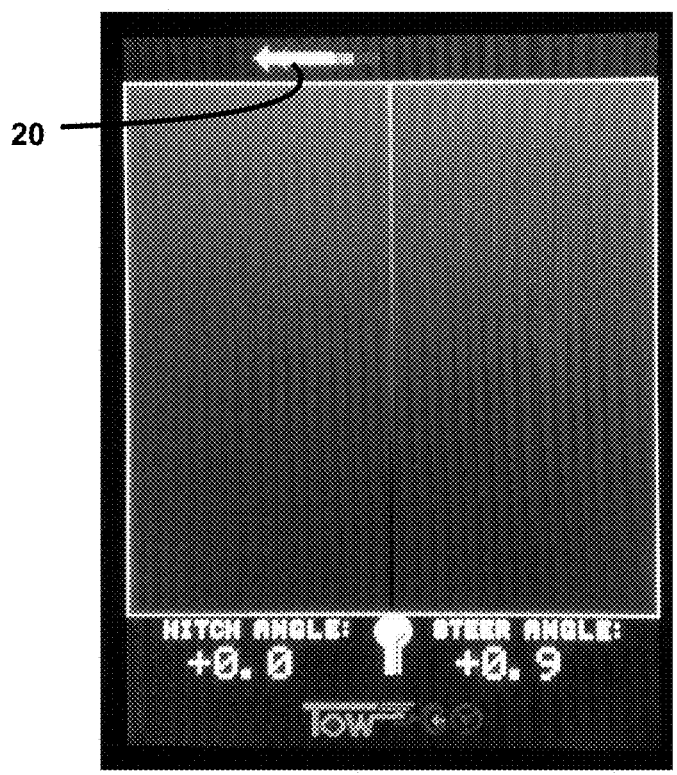
FIG. 9 depicts a display for guiding a user while backing with a trailer during the special condition when the vehicle and trailer are inline.

A special case exists when the vehicle and trailer are in direct alignment. In this case, the prediction white line will coincide with the gray center line and the TCB. However, even though the all the lines are centered in the display, the position of the steering wheel will determine in which direction the trailer will break away from this alignment as backing occurs. Many people backing a trailer without a system such as the present invention are familiar with the notion of steering the trailer by holding the steering wheel at the bottom of its circle and moving that point in the direction he or she desires the trailer to go. With the present invention, a corresponding visual aid is present as is shown in FIG. 9. As the steering wheel is moved, an arrow or an animated indicator 20 (or any other form of display graphic including the sign on a numeric value) should be provided to show the direction in which the trailer will turn as backing proceeds.

Figure 10:
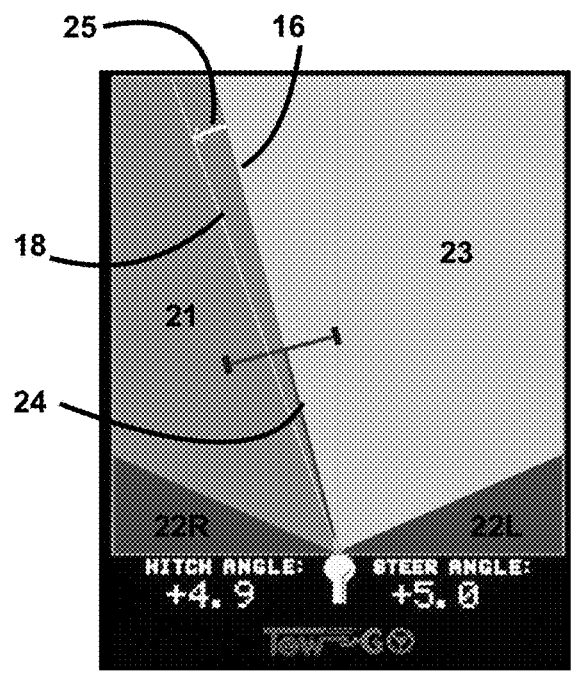
FIG. 10 depicts a display for guiding a user while backing with a trailer showing additional display features.

Other display feature options are shown in an alternate display approach in FIG. 10. In this figure, the background colors are adjusted to use green for any area 21 that can be reached without an additional maneuver (that is to say, cannot be reached directly but can only be reached by having the center line of the trailer cross the center line of the vehicle), red for areas 22 that cannot be reached, and yellow for multi-maneuvered areas 23. In addition to colored zones, a graphical representation of a trailer viewed from above 24 is added to make the TCB easier to visualize. (The software programming techniques for generating the graphical display images discussed herein are well know and understood by those skilled in the art of graphics programming.)

There are three limits of particular interest in this system. The first limit is a collision range that corresponds to the trailer or the towed item making contact with a corner or other point on the towing vehicle (the Hitch Angle Collision Limit, or HACL) and is a function of the shape of the trailer and the hitch angle. This limit is dependent on what is being towed and can be provided by the driver as a user input to the system. For example, if a boat is being towed, the trailer (i.e., via the hitch angle) might be allowed to turn a good bit greater than if a camper is being towed because the pointed bow of a boat gives more turning room than a squared-off camper. Furthermore, the maximum allowable hitch angle value might be different for the left side and right side turning (e.g., if the camper had a propane bottle on one side, contact with the vehicle might occur soon than if turning to the other side), in which case, the driver might set these two inputs individually (a left HACL and a right HACL). This first limit can be displayed by adding triangular areas 22 in the bottom left and bottom right corners of the image.

A second limit corresponds to where the steering wheel is turned to its maximum range (wheel lock) thereby preventing the vehicle from being turned any greater (i.e., more sharply, or with a shorter turning radius). When backing with a trailer, a very tight or small turning radius (corresponding to having the wheels of the vehicle sharply turned towards the trailer far to the left or right) will result in the vehicle turning onto the current path of the trailer very quickly (such that the direction of the trailer changes very little before the vehicle comes in line with the trailer). Wheel lock limits how tight the vehicle's turning radius can be and, as a result, there is a small range between the current trailer direction and the nearest predicted direction of the vehicle and trailer becoming aligned corresponding to the wheel lock turning radius. This small range corresponds to the amount the trailer will turn before the vehicle becomes aligned with the trailer when the vehicle is turned as sharply towards the trailer as possible (i.e., turned to wheel lock) and for other than larger hitch angles, this range is generally slight or imperceptible. This second limit can be displayed by including the area between the current hitch angle line 8 and a line representing the predicted direction 18 when the steering is turned to wheel lock to the yellow multi-maneuvered area 23 (shown to the right of the hitch angle line in the figure).

A third limit is in a sense the opposite of the second limit and corresponds to the vehicle not being turned enough. At any instant while the vehicle and trailer are backing up, the trailer is both backing and turning (as described in the '953 patent) and if the vehicle's turning radius is less than the instantaneous turning of the trailer (i.e., the turning radius of the trailer which is generally the trailer length divided by the tangent of the hitch angle), the vehicle and the trailer will not converge to alignment. If the turning radius of the vehicle is less than this turning radius of the trailer, this will lead to a jackknife condition if a steering correction is not made. However, there may be times during backing when it could be desirable to have the vehicle's turning radius be equal to (or less than) the trailer's turning radius; when the vehicle's turning radius is equal the trailer's turning radius, the driver would achieve an infinite backing angle (IBA) and the trailer could be backed continuously until a desired direction is generally achieved because the hitch angle would neither increase nor decrease. (The IBA is generally equal to the arctangent of the product of the tangent of the hitch angle, h, and the ratio of the vehicle wheelbase, w, to the trailer length, L, i.e., IBA=arctan(Tan(h)*w/L); IBA is a function of the hitch angle and is independent of the vehicle's turning radius.) A user of the system should typically avoid having the prediction direction white line cross into this area where the vehicle's rate of convergence towards the trailer falls short of the rate at which the trailer turns away. With the hitch angle neither increasing nor decreasing, the trailer and vehicle will not be converging on becoming aligned with this limit and any angle predicting the direction in which the vehicle and trailer will become aligned will be undefined with the result being the prediction direction white line can not be made visible in the display.

For greater user friendliness, the display can incorporate a few additional features. An arrow 25 (shown curved near the top of FIG. 10) can be incorporated that points from the TCB to the prediction direction white line as a constant reminder of motion of the trailer's changing direction (relative to the ground). An image of a trailer can also be superimposed on the TCB to remind the user of where the trailer actually is any moment and this trailer image might also be customizable to reflect a variety of trailers (one axel, two axel, etc. or by type such as utility trailer, boat trailer, camper, horse trailer, trailer with bumpers verses rollers, and the like) and this trailer type might image be further customizable to reflect the item that is being trailered (a boat, snowmobiles, jet skis, motorcycles, and so on). A visual jackknife alert could be provided, such as a flashing word "JACKKNIFE" superimposed on the display (in addition to any audio alert), when the trailer turning radius exceeds the vehicle turning radius. A visual collision alert could be provided, such as a flashing word "COLLISION" superimposed on the display (in addition to any audio alert), when the prediction direction white line enters the red zones. Under any jackknife condition, the trailer wants to turn around and be pulled resulting in a prediction direction of 180° which would cause the white line not to be visible (i.e., it is rotated off screen).

Figure 11:
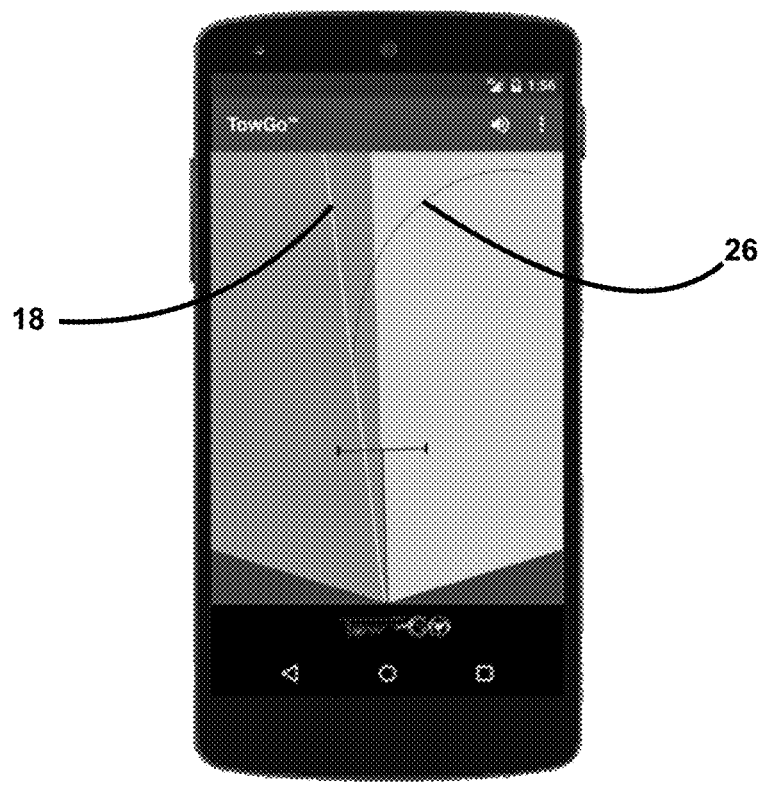
FIG. 11 depicts a display for guiding a user while backing with a trailer showing an alternate display approach to that depicted in FIG. 10.

FIG. 11 depicts an additional variation on a backup system display screen. Notably present in this view is a curved blue line 26 drawn from near the center of the white prediction line to the opposite side of the display from that on which the white prediction line 18 is shown. This blue line 26 represents the current turning radius of the vehicle and is an indication of how quickly the trailer will begin to turn to the opposite side of the vehicle upon reaching alignment with the vehicle. The curvature of this blue line 26 will be more curved with a tighter turning radius and will become more straightened as the turning radius is less tight. When alignment of the vehicle and the trailer is achieved, the position of the vehicle's steerable wheels determines the turning radius and this turning radius determines how quickly the trailer will deviate from its just attained, aligned position. This indication of the vehicle's turning radius sharpness is useful to aid the driver in gauging the extent of a potential overshoot of the trailer direction following achieving alignment. Naturally, any item color can be changed as desired for all displays, above.

The display may show additional items reflecting other information. As described in U.S. patent application Ser. No. 14/791,283, by Shepard titled "PORTABLE TRAILER GUIDANCE SYSTEM" that was filed on Jul. 3, 2015, it is anticipated that this system will be used in conjunction with a steering wheel mounted turning sensor. In particular, it is anticipated that this steering sensor will incorporate an Inertial Measurement Unit (IMU) to sense the rotation of the steering wheel with the IMU's gyroscopes (as is well known and understood by those skilled in the art of IMU operation and programming, the gyroscopes and accelerometers incorporated in an IMU can be used together to obtain a more accurate rotation position value). However, the Accelerometers within the IMU can also be used to collect motion data indicating the changing position of the vehicle (i.e., the accelerometers will provide an indication of when the vehicle is in motion, whether that motion is forward or reverse, and the rate of acceleration or deceleration). For example, with this additional data, the display can incorporate additional features to indicate the rate of convergence of the TCB to the prediction direction white line (e.g., the curved arrow could be animated to grow from the TCB to the prediction direction white line and the speed of this animation could reflect how quickly the vehicle will become inline with the trailer), or any jackknife alarms could be suppressed while the vehicle is not in motion. Other alarms could likewise be suppressed such if a distance sensing device (such as an ultrasonic range sensor similar to that sold by Radio Shack, part number 2760342 which can measure distance from 3 cm to 4 meters) were to be incorporated at the corners of the vehicle and trailer to detect an object with which the vehicle or trailer could collide. A collision alert for an object in the forward path of the vehicle could be suppressed if the vehicle is motionless or backing.

Figure 12:
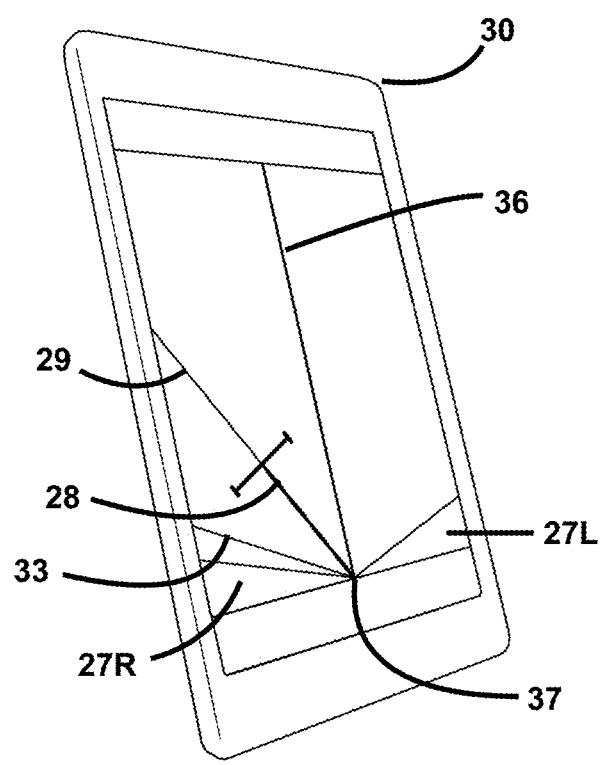
FIG. 12 depicts a display for guiding a user while backing with a trailer showing a predicted path.

FIG. 12 depicts an example display device 30 according to the present invention. The screen image represents the area behind the towing vehicle with a centerline 36 indicating straight back behind the towing vehicle. Visible in the figure is the hitch angle line 29 and a depiction of a trailer 28 representative of the trailer's current position and hitch angle. At the bottom center of the display is a depiction of the hitch ball 37. Also depicted in the screen image are two exclusion areas 27L & 27R representative of hitch angle ranges for which the trailer would collide with the towing vehicle. (In the alternative, in so much as some operators become uncomfortable when the hitch angle becomes very large regardless of whether or not there is sufficient clearance to further increase the hitch angle, the two exclusion areas 27L & 27R could be determined from arbitrary angles set by the vehicle operator). A prediction line 33 depicts the direction in which the vehicle and trailer will be headed when they become aligned according to algorithms disclosed in the '953 and '856 patents. The hitch angle line 29, the prediction line 33, the boundary lines (Hitch Angle Collision Limits, HACL) demarking the two exclusion areas 27L & 27R all emanate from the bottom center of the display (i.e., from the depiction of the hitch ball 37).

Generally speaking with respect to the image, with the trailer angled towards the right side of the towing vehicle (i.e., the image, being of the view behind the towing vehicle, is drawn with the trailer turned to the left side of the image corresponding to the right side of the towing vehicle), in order to bring about the depicted position of the prediction line 33, the towing vehicle must be steered to the right (i.e., the steering wheel was rotated clockwise with respect to a straight-ahead steering). From this steering position, if the steering were to be changed to be more sharply turned (i.e., rotating the steering wheel further clockwise to affect a smaller turning radius), the vehicle would more quickly turn to come inline with the trailer along with correspondingly less rotation by the trailer during the maneuver and resulting in the depicted position of the prediction line 33 being drawn closer to the hitch angle line 29. On the other hand, if the steering were to be changed to be more straight (i.e., rotating the steering wheel counter-clockwise), it would take a greater amount of distance backing up before alignment with the trailer would be achieved along with correspondingly more rotation by the trailer during the maneuver and resulting in the prediction line 33 moving farther from the hitch angle line 29.

While the parent application of the present application referenced the '953 patent, this continuation-in-part is filed adding the following portions taken from the '953 patent for the purpose of clarity and convenience.

The '953 patent taught that "as the vehicle backs up some distance, $\Delta x$, . . . as is most often the case in normal operation, a portion of the force in the $\Delta x$ direction is translated into backing up the trailer while a portion is translated into rotating the trailer. Typically, most of the force in the $\Delta x$ direction is translated into backing up the trailer because the centerline of the trailer and the $\Delta x$ direction (along the center line of the vehicle) are kept close to parallel. However, following this backing up of the distance $\Delta x$, the centerline of the trailer and the $\Delta x$ direction will be less parallel due to the rotation that occurred. As a result, if the vehicle were to back up an additional distance of $\Delta x$, an even greater portion of the force would be translated into rotating the trailer. Each successive distance $\Delta x$ backed up will translate into a growing portion to be applied to rotating the trailer until . . . the centerline of the trailer and the $\Delta x$ direction are perpendicular . . . .

"[T]he force, f, at the hitch of the trailer, T, is the sum of two vectors, b and r, that meet each other at a right angle. When a force, f, is applied to the hitch of a trailer by a backing vehicle, part of that force, b, is parallel to (i.e., in-line with) the centerline of the trailer and is, therefore, in the direction of backing up the trailer. However, the other part of the force, r, is perpendicular to the centerline of the trailer and is in the direction of rotating the trailer about a point midway between its two wheels (i.e., on the centerline of the trailer). The angle between the direction of the applied force and the direction of the centerline of the trailer is called the hitch angle and, for this discussion, shall be called Theta ($\theta$). If we assume that the force, f, applied is proportional to the distance backed up, $\Delta x$, we can calculate the magnitudes of b and r as being $\Delta x \, \cos(\theta)$ and $\Delta x \, \sin(\theta)$, respectively . . . .

"To compute the change in the hitch angle resulting from an incremental displacement, $\Delta x$, of the hitch, two components must be considered: the increase associated with the rotation of the trailer and the decrease associated with the turning of the vehicle. The sum of these two components must be decreasing when compared over two successive increments of motion ($\Delta x$) in order to obtain convergence on a solution. When this does not occur, the vehicle operator must be alerted to change his steering or to drive forward (directly away from the target) to get the vehicle, trailer and target all in-line before continuing.

" . . . [T]o calculate the angular contribution from the rotation of the trailer, $\alpha$, to the change in hitch angle resulting from an incremental displacement, $\Delta x$, one must recognize the geometry of that rotation. The length of the trailer, L, forms two of the sides of a triangle formed when the trailer rotates about point p, where the third side is the rotation contribution component, r . . . . From that discussion, r has the magnitude $\Delta x \, \sin(\theta)$. The angle of rotation, $\alpha$, is bisected in the formation of two similar right triangles each having L for their hypotenuse and $\gamma$ for half of bisected angle $\alpha$. Simple geometry dictates the relationship $\sin \gamma = \frac{1}{2}r/L$ which can be restated as $\gamma = \sin^{-1}(\frac{1}{2}r/L)$. The angular contribution from the rotation of the trailer, $\alpha$, is therefore equal to $2 \sin^{-1}(r/2L)$. Substituting in for r yields:

$$\alpha = 2 \sin^{-1}(\Delta x \, \sin(\theta)/2L).$$

" . . . To calculate the contribution from the turning of the vehicle, $\beta$, to the change in hitch angle resulting from an incremental backing displacement, $\Delta x$, one must recognize the geometry of the curved path of the vehicle as well. Even if the vehicle and the trailer are momentarily in-line resulting in no angular change in the direction of the trailer, the vehicle is assumed to be following a circular path and the angular change in the direction of the vehicle will effect the angle between the vehicle and the trailer. The radius of this circle, R, is the turning radius and is a function of the steering angle of the front wheels, 503. The circumference of the circular path, 504, on which the vehicle travels equals $2\pi R$ and corresponds to 360°. The angular contribution of the vehicle by following this curved path is determined by taking the same percentage out of 360° that the incremental distance traveled by the vehicle takes out of the entire circumference of the circle on which this curved path exists. In other words, since $\Delta x$ is an incremental distance travelled on the circumference of a circle defined by the turning radius, one can compute the percentage of that circumference as equal to: $\Delta x/2\pi R$; likewise, the change in direction, $\beta$, is that same proportion of a full rotation, and the percentage of that rotation is equal to: $\beta/360°$. Since both calculations result in the same percentage, they can be set equal to each other to arrive at: $\Delta x/2\pi R \beta/360°$ or $\beta = 180\Delta x/\pi R$.

"Computation of the turning radius of a vehicle can be simplified . . . . Front wheel, 601, of the vehicle steers by turning about a point of rotation at or near its center that is approximately in line with rear wheel, 602, and their centers are separated by a distance called the wheel base, w. When steering occurs, front wheel, 601, rotates some amount shown as angle φ. The center point, 603, of the circle of turning is found at the point of intersection of two lines, one each drawn through the center of and perpendicular to the path of travel of each wheel; this dictates that these two lines will meet at an angle equal to the steering angle, φ. Rear wheel turning radius, R, is computed with simple geometry as: R=w/Tan(φ). This approximation will be good enough in many cases. But, it can be made more precise without much effort by incorporating the added distance, Ω', from the center of rear wheel, 602, to the hitch-ball, 604, that is at the point of the hitch rotation (assuming the hitch ball is in-line with the two wheels). This is computed using the Pythagorean theorem resulting in the equation for the turning radius, R', of the hitch-ball, 604, at the point of the hitch rotation: R'=SQRT((w/Tan(φ))²+w'²). It should be noted that this is an approximation and, as will be addressed below regarding precision, does not have to be perfect (further accuracy would require that the second front and rear wheels be included in the calculation as well as the positioning of the hitch-ball half way between the left and right rear wheels rather than assuming it is in-line with the front and rear wheel). It should also be noted that with front and rear wheel steering, this formula would be modified.

"Since the steering wheel is coupled to the wheel steering mechanism, it would be possible to put a sensor on the steering wheel or its shaft and detect the angular position of that steering wheel or shaft and translate that angular position into the angular position of the front wheels. Furthermore, a sensor relating to the steering of the vehicle could include sufficient computational capability (even if only in the form of a lookup table to convert from one measure to another) to sense either the steering wheel or shaft's angular position or the wheel's angular position and return the turning radius thereby saving the main processor the computation time of performing that translation. These variations will be clear to those skilled in the art.

"Now, by combining the increase associated with the rotation of the trailer and the decrease associated with the turning of the vehicle into a single equation, the change in hitch angle, Δθ, resulting from an incremental distance, Δx, traveled by the vehicle can be expressed as:

$$\Delta\theta = 2\,\text{Sin}^{-1}(\Delta x\,\text{Sin}(\theta)/2L) - 180\Delta x/\pi R$$

"The new hitch angle, θ', resulting from an incremental distance, Δx, traveled by the vehicle is expressed as:

$$\theta' = \theta + 2\,\text{Sin}^{-1}(\Delta x\,\text{Sin}(\theta)/2L) - 180\Delta x/\pi R.$$

This shall be called the backing equation."

This excerpt from the '953 patent has been included herein for clarity and convenience.

From the '953 patent, it can be observed from the Δθ equation that when the hitch angle is not changing, that is to say when Δθ=0, the component of rotation due to the trailer, $2\,\text{Sin}^{-1}(\Delta x\,\text{Sin}(\theta)/2L)$, and the component of rotation from the turning of the vehicle, 180Δx/πR, must be equal. This is the condition of infinite turning where, in theory in a perfect world, the turning of the vehicle ($R_V$) exactly matches the turning of the trailer ($R_T$). Stated another way, the condition of infinite turning generally occurs when the turning radius of the trailer, where $R_T$=L/Sin(θ), matches the turning radius of the vehicle, where $R_V$=w/Tan(φ); or the condition of infinite turning occurs when: w/Tan(φ)=L/Sin(θ). Note that both components of the Δθ equation contain the reciprocal of the turning radius where 180Δx/πR could be rewritten as 180Δx/π$R_V$ and $2\,\text{Sin}^{-1}(\Delta x\,\text{Sin}(\theta)/2L)$ could be rewritten as $2\,\text{Sin}^{-1}(\Delta x/2R_T)$; note also that these equations are dependent only on Δx and the two turning radii and are independent of a time input. This enables the solution to be found even when the vehicle is stationary thereby enabling an operator to stop and assess the position of the steering wheel.

When an operator is backing up with a trailer, it is useful to know a sense of the magnitude of the turning of the trailer relative to the vehicle in which the operator is sitting. Such a sense can be provided by displaying a graphic that can indicate magnitude and its sign (for example, an arrow). When the trailer is not going to turn relative to the vehicle given the current hitch angle and the vehicle front wheels' angle, i.e., when Δθ=0, the arrow can be hidden or displayed as a vertical line or a dot or as any form that does not indicate a direction with a magnitude. If the trailer is going to turn slightly farther to the left given the current hitch angle and the vehicle front wheels' angle, an arrow pointing to the left and having a small length could be shown. If the trailer is going to turn significantly farther to the right given the current hitch angle and the vehicle front wheels' angle, an arrow pointing to the right and having a long length could be shown. Since the length of the arrow can be scaled to fit the size of the display while still providing the operator with the needed sense of the magnitude, the value for Δx can be set to 1 and the Δθ equation can be simplified to:

$$\Delta\theta = 2\,\text{Sin}^{-1}(\text{Sin}(\theta)/2L) - 180\,\text{Tan}(\varphi)/\pi w$$

From this equation it can be seen that the sense of the magnitude of Δθ can be derived from only the turning radius of the trailer and the turning radius of the vehicle:

$$\Delta\theta = 2\,\text{Sin}^{-1}(1/(2R_T)) - 180/(\pi R_V)$$

Also from the derivation of Δθ from the '953 teaching, for each increment of backing by the vehicle, Δx, there is a component of backing the trailer, b, and a component of rotating or turning the trailer, r where b=Δx Cos(θ) and r=Δx Sin(θ). These two components form two sides of a force vector triangle. It is an aspect of the invention of the present Patent Application that this force vector triangle, or at least the r component, is a useful alternate sense of the magnitude to display to the operator to inform the operator of the value of Δθ or a representative value for Δθ that gives the operator the sense of in which direction the hitch angle will change and by how much Δθ will change for a given amount of steering. This informing can take the form of an element such as the displayed arrow where the length of the arrow changes according to the magnitude of the value (see FIG. 10). Alternatively, a displayed element could be animated where the speed of the animation changes according to the magnitude of the value (see FIG. 9). Alternatively, a displayed element could change color or brightness according to the magnitude of the value. Alternatively, other display techniques could be employed. Alternatively, an audio signal could be sounded such as a tone that changes volume or pitch as the magnitude increases. Alternatively, any one or more of the above methods of indicating the magnitude of the value could be displayed simultaneously.

Figure 13:
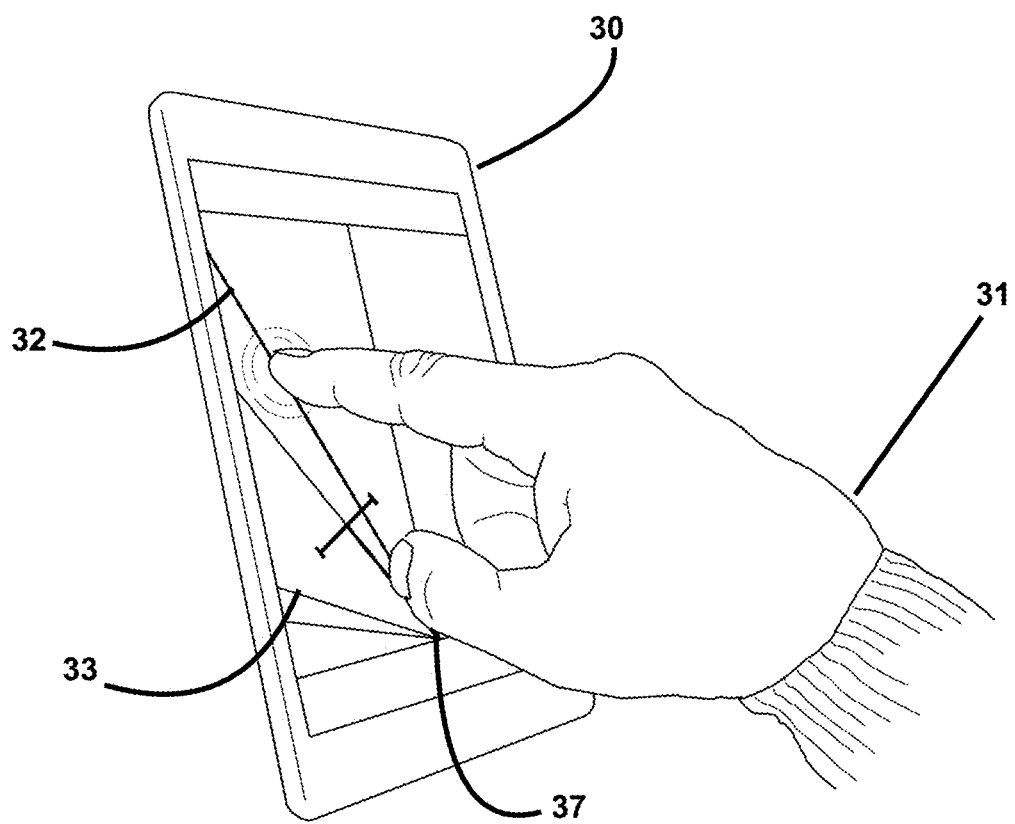
FIG. 13 depicts a touch sensitive display for guiding a user while backing with a trailer showing the selection of a preferred path.

FIG. 13 depicts an example of user input on a touch sensitive display device 30 according to the present invention. The user 31 indicates an intended line 32 (i.e., a desired position for the prediction line 33) by touching the screen at a point where the user desires the prediction line 33 to be. Any point along the length of the intended line 32 will result in an adequate indication. By making a touch contact, the intended line 32 is immediately drawn to the screen and the location of this intended line 32 can be refined by dragging the touch (the intended line 32 will move with the dragging touch point). Like the other lines on the display, the intended line 32 emanates from the bottom center of the display 34 (i.e., from the depiction of the hitch ball). In addition to the intended line 32 appearing, an optional input feature such as a button icon can also be made to appear on the display to dismiss the intended line selection; other optional dismissal mechanisms can be incorporated including a double touch or tap to dismiss, a touch and drag motion (a swipe gesture) to the edge of the screen to dismiss, a display shaking to dismiss, or any of a number of other possible user motions or gestures to dismiss. Such a mechanism to dismiss or cancel the up of the trailer according to the entered intended or desired direction. An alternative mechanism to input the desired direction would be to press a button (e.g., a button on the steering wheel sensor that is in communication with the rest of the system as described in the '283 application) or touch an on screen button to indicate that the current prediction line 33 should be selected as the intended line 32.

Figure 14:
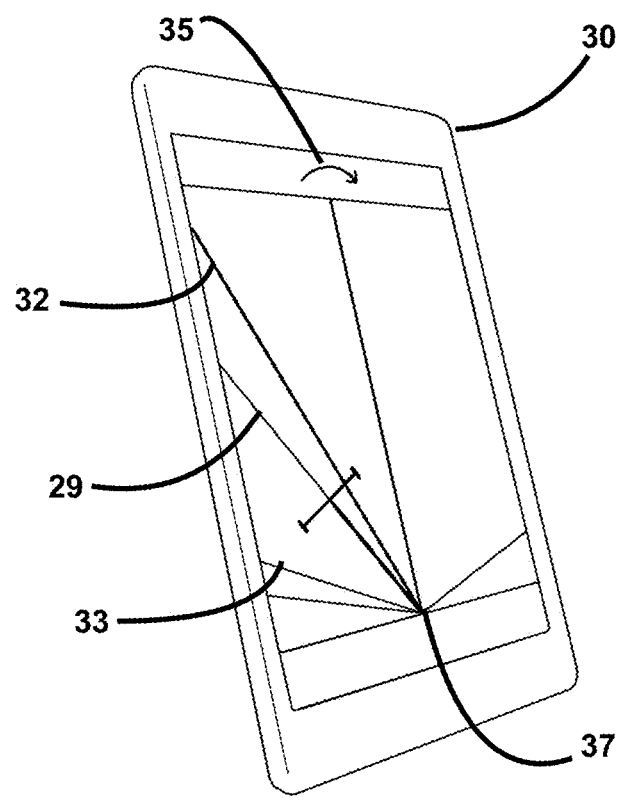
FIG. 14 depicts a display for guiding a user while backing with a trailer showing guidance to the preferred path.
Figure 15:
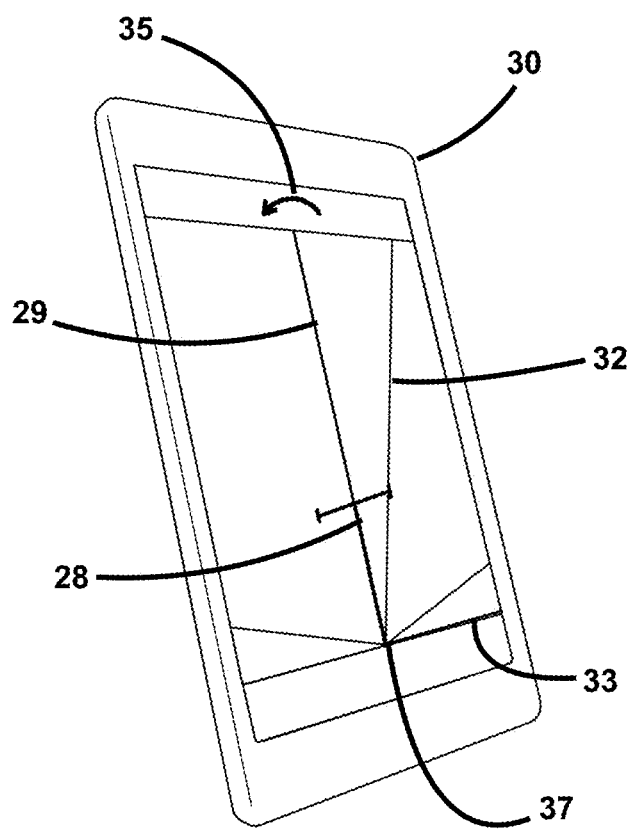
FIG. 15 depicts a display for guiding a user while backing with a trailer showing the first of two steps of guidance to the preferred path after the towing vehicle and trailer pass through alignment.

FIG. 14 depicts an example display device 30 following selection of a desired direction by indicating the intended line 32 according to the present invention. Upon removing the touch input for indicating the desired position for the prediction line 33, the intended line 32 having been drawn, an additional steering adjustment indicator 35 is added to the display. This steering adjustment indicator 35 shows the direction in which the steering wheel should be turned (relative to its currently steered position) in order to move the prediction line 33 towards the intended line 32. As the steering wheel is rotated according to the steering adjustment indicator 35, the display lines will be recomputed by the backing guidance system (e.g., as described in the '953 and '856 patents) and the prediction line 33 will be redrawn accordingly. As depicted in FIG. 14, as the steering wheel is rotated as shown by the steering adjustment indicator 35 on the display (i.e., clockwise), the recomputed location for the intended line 32 will become closer and closer to the prediction line 33. In FIG. 14, the intended line 32 was selected to be and is shown on the far side of the hitch angle line 29. In order to achieve the direction corresponding to this intended line 32, the vehicle will first need to become aligned with the trailer and then, second, the trailer can turn to the other side of the vehicle. Until the vehicle is first turned to become aligned with the trailer, the prediction line 33 will only be recomputed to become aligned with the trailer (i.e., to asymptotically approach becoming collinear with the hitch angle line 29 as the steering is increased). Refer now to FIG. 15. When the towing vehicle backs up and becomes aligned with the trailer (i.e., when the hitch angle reaches zero), the hitch angle line 29 and the representation of the trailer 28 are both drawn in the center of the display. With this motion, there are two ways to adjust the image of the intended line—relative to the vehicle or relative to the trailer.

When adjusting the intended line 32 relative to the vehicle, recall that the image on the display represents the view behind the towing vehicle and as the vehicle turns during the backing maneuver and this image will become rotated from the position it was in when the intended line was selected. Since the desired direction for the trailer is a direction relative to the ground, any rotation by the towing vehicle (relative to the ground) must be used to adjust the angle of the intended line 32 on the display. In other words, since the vehicle will turn (i.e., rotate) during the backing maneuver, the intended line's angle must be adjusted by the amount of this rotation to keep it pointing in the same direction relative to the ground that it was in prior this rotation when the selection of the intended direction was made. In other words, as the vehicle backs up, the image will rotate a number of degrees clockwise or counter-clockwise and, to correct the intended line's direction on the display, the angle of the intended line must be rotated on the display by the same number of degrees but in the opposite direction (counter-clockwise or clockwise, respectively).

When adjusting the intended line 32 relative to the trailer, the intended line 32 will still form an angle to the hitch angle line 29, but not by the same angular amount; the angle between the hitch angle line 29 and the intended line 32 will have grown slightly (generally speaking, it will have increased by the amount the trailer has rotated during the maneuver). In other words, as the trailer is backed up, the direction of the trailer in the display represents the trailer's position on the ground. If the trailer rotates a number of degrees clockwise or counter-clockwise during the backing maneuver, one must first correct the trailer's position to where it was before the maneuver and the intended line's direction should be unchanged from that direction. On the display, the angle of the trailer's image 28 (i.e., the angle to the hitch angle line 29) must be rotated by the same number of degrees but in the opposite direction (counter-clockwise or clockwise, respectively) and the intended line 32 drawn from that point by the same angle as when it was selected.

With either vehicle based or trailer based adjustment of the intended line 32, the rotation of the vehicle or the trailer must be determined. As described above and in the '777 application, the rotation of the vehicle or the trailer can be measured by an IMU in or on the vehicle or the trailer (an alternative means to measure the rotation of the vehicle is to measure the rotation of the trailer and adjust that trailer rotation with the hitch angle value to establish the vehicle's rotation).

Figure 16:
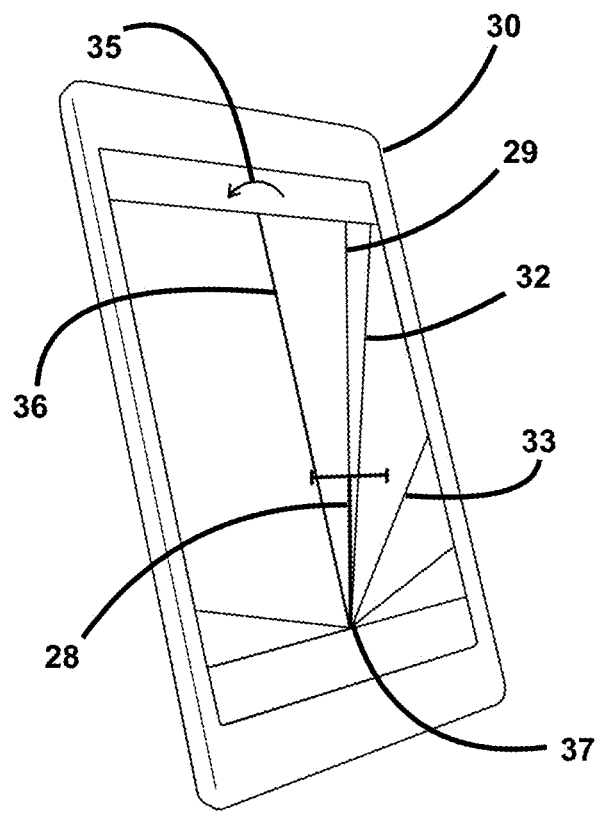
FIG. 16 depicts a display for guiding a user while backing with a trailer showing the second of two steps of guidance to the preferred path after the towing vehicle and trailer pass through alignment.

Returning to FIG. 15, with the steering still to the clockwise direction, as the vehicle and trailer pass through the aligned position, the prediction line 33 will swing down to the bottom of the display's right side (i.e., a jackknife condition—a state that can only be remedied by reversing the steering to the other side of the towing vehicle). As this happens, the steering adjustment indicator 35 will change to a counter-clockwise indication and can optionally alert the operator via highlighting (e.g., the color can be changed such as to red and/or can be made to blink rapidly and/or can be accompanied by an audio alert) to indicate that the steering is to the wrong side of the towing vehicle and this highlighting can be continued until the wheels of the towing vehicle cross the straight ahead position and are turned to the desired side of the towing vehicle. From this point, the highlighting may be removed, as is depicted in FIG. 16. At this stage, the intended line 32 falls between the hitch angle line 29 and the prediction line 33. As discussed above with respect to FIG. 13 and then FIG. 14, the touch selection was made such that it placed the intended line to the opposite side of the hitch angle line 29 from the predicted line 33 which resulted in a two stage maneuver—first to steer the towing vehicle to become aligned with the trailer and then to steer the towing vehicle to its other side. Had the touch selection been made between hitch angle line 29 and the predicted line 33 the system would be in a state similar to that depicted in FIG. 16.

As depicted in FIG. 16, the user must continue to follow the guidance of the steering adjustment indicator 35 until the intended line 32 is collinear with the prediction line 33.

When intended line 32 becomes collinear with the prediction line 33, the steering adjustment indicator 35 changes to a vertical arrow (or to any other indicator suggesting no change in steering) indicating that the steering wheel need not be turned from its then position.

In so much as the prediction line 33 is derived from the current hitch angle and the towing vehicle's current steering, it is only necessary for the display software to know the prediction line's angle (i.e., the angle between the centerline 36 and the prediction line 33) and the intended line's angle (i.e., the angle between the centerline and the intended line 32) and their signs or to which side of the centerline of the towing vehicle the lines fall. If the prediction line's angle is greater than the intended line's angle, then the vehicle's steering must be increased (i.e., turned clockwise if the trailer is turned to the right side of the towing vehicle or turned counter-clockwise if the trailer is turned to the left side of the towing vehicle). If the prediction line's angle is less than the intended line's angle, then the vehicle's steering must be straightened (or decreased; i.e., turned counter-clockwise if the trailer is turned to the right side of the towing vehicle or turned clockwise if the trailer is turned to the left side of the towing vehicle). If the prediction line 33 and the intended line 32 are on opposite sides of the centerline 36, then the steering must be increased to become inline with the trailer so that the prediction line can be crossed to the same side as the intended line. If the prediction line 33 and the intended line 32 are collinear, then no steering change is required. Optionally in addition, the steering adjustment indicator 35 can be highlighted if the intended line angle is less than (or to the opposite side from) the hitch angle line 29.

An additional enhancement can optionally be incorporated if the towing vehicle's steering angle value is available to the display software. In this case, the towing vehicle's steering can gradually be straightened (or decreased) as the towing vehicle and trailer approach alignment. By doing this, the system can enable the user to avoid the rapid turning to the opposite side of the towing vehicle as the trailer crosses the centerline 36 of the towing vehicle.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A system for predicting a future direction of a trailer when being backed up by a towing vehicle, the trailer and the vehicle being coupled together by a jointed connection, the jointed connection having a connection angle, and the vehicle having a plurality of steering positions wherein a first steering position and a second steering position, different from the first steering position, are among the plurality of steering positions, the system comprising a graphical component visible to an operator of the vehicle on which the system generates and displays (i) a graphical representation of the connection angle, (ii) a graphical representation of the predicted future direction for the trailer, and (iii) a graphical representation of a predicted change in the connection angle where the predicted change is selected from a first predicted change corresponding to the first steering position and a second predicted change corresponding to the second steering position.

2. The system of claim 1 whereby the first predicted change corresponding to the first steering position is different from the second predicted change corresponding to the second steering position.

3. The system of claim 2 whereby the graphical representation of the first predicted change in the connection angle is distinguishable from the graphical representation of the second predicted change in the connection angle.

4. The graphical representation of the predicted change in the connection angle of claim 1 comprising one or more of (i) a graphical representation of the magnitude of the predicted change, (ii) a graphical representation of the sign of the predicted change, (iii) a graphical representation of the magnitude of a component of a force vector corresponding to the rotating or turning of the trailer, (iv) a graphical representation of the magnitude of a component of a force vector corresponding to the backing of the trailer, and (v) one or more graphical representation elements selected from a list of possible graphical elements, the list comprising lines, curves, arrows, geometric shapes, characters, numerals, and animations.

5. The system of claim 1 wherein the predicted future direction for the trailer comprises a direction where the towing vehicle and the trailer become generally aligned.

6. The system of claim 1 further comprising steering guidance for bringing the predicted future direction of the trailer to approach a desired direction for the trailer wherein the steering guidance comprises an instruction to the operator for moving the steering wheel.

7. The system of claim 6 wherein the desired direction for the trailer is indicated by touching an electronic display.

8. The instruction for moving the steering wheel of claim 6 further comprising one or more of instructing (i) a rotational direction to move the steering wheel, and (ii) a rotational distance to move the steering wheel.

9. The system of claim 6 further comprising an input mechanism to cancel or delete a previously provided desired direction for the trailer.

10. A method for a display device to be used by a system for guiding a trailer being backed up by a towing vehicle, the trailer and the vehicle being coupled together by a jointed connection where the jointed connection has a connection angle, from an initial position corresponding to an initial connection angle to a future position predicted by the system corresponding to a future direction for the trailer, the method comprising the system providing to an operator of the vehicle on the display device (i) a graphical representation of the initial connection angle, (ii) a graphical representation of the predicted future direction for the trailer, and (iii) a graphical representation of a predicted change in the connection angle where the predicted change is one of a first predicted change corresponding to a first steering position of the vehicle and a second predicted change corresponding to a second steering position of the vehicle, the second steering position being different from the first steering position, where the first steering position and the second steering position are among a plurality of possible steering positions of the vehicle.

11. The method of claim 10 wherein the display device is selected from a list of display devices, the list comprising an electronic display, an electronic graphical display, a hand-held device, a portable device, a mobile device, a phone, a smart phone, a tablet, a computer, a laptop computer, a portable computer, and a wireless display device.

12. The method of claim 10 wherein the predicted direction for the trailer comprises a direction where the towing vehicle and the trailer become generally aligned.

13. The method of claim 10 further comprising the system providing steering guidance to the operator, the steering guidance comprising indicating one or more of (i) a rotational direction to move the steering wheel, and (ii) a rotational distance to move the steering wheel.

14. The method of claim 13 further comprising the step of the operator steering the towing vehicle as indicated by the steering guidance.

15. The method of claim 13 further comprising setting a desired direction for the trailer in response to input from the operator.

16. The method of claim 15 further comprising terminating the steering guidance in response to input from the operator.

17. The method of claim 16 wherein input from the operator comprises one or more from the list of (i) touching a displayed button, (ii) double-tapping, (iii) double touching, (iv) swiping or touching and dragging, and (v) shaking.

18. The method of claim 10 wherein providing a graphical representation of a predicted change in the connection angle comprises providing one or more of (i) a graphical representation of the magnitude of the predicted change, (ii) a graphical representation of the sign of the predicted change, (iii) a graphical representation of the magnitude of a component of a force vector corresponding to the rotating or turning of the trailer, (iv) a graphical representation of the magnitude of a component of a force vector corresponding to the backing of the trailer, and (v) one or more graphical representation elements selected from a list of possible graphical elements, the list comprising lines, curves, arrows, geometric shapes, characters, numerals, and animations.

19. The method of claim 10 further comprising the step of the operator stopping the vehicle and assessing the operation.

20. The system of claim 1 further comprising one or more of a left and/or right angle that an operator has set as a maximum desired angle or angles, and an indication of a range of potential directions that cannot be reached without requiring a center line of travel of the trailer to cross a center line of travel of the vehicle.

\* \* \* \* \*